April 24, 1962 B. J. VARDEN 3,031,157
CONTROLLABLE MOUNT FOR AIRCRAFT POWER PLANT
Filed Nov. 5, 1958 3 Sheets-Sheet 1
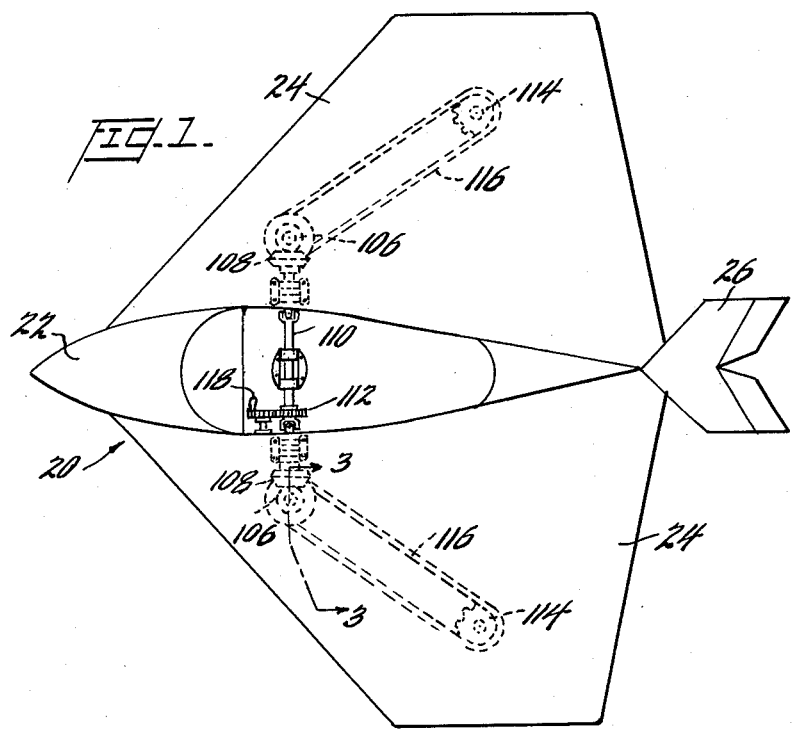
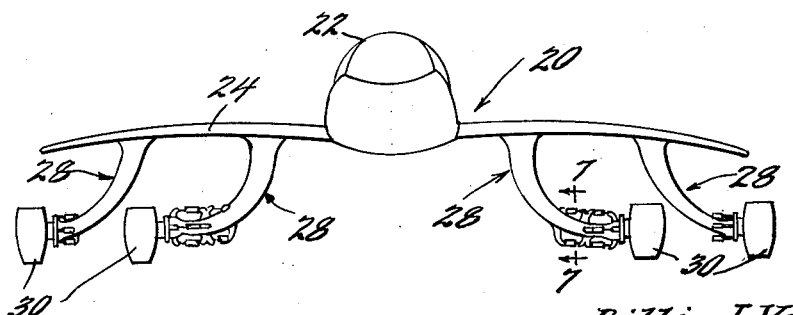
INVENTOR
Billie J. Varden,
BY Parker and Walsh.
ATTORNEYS

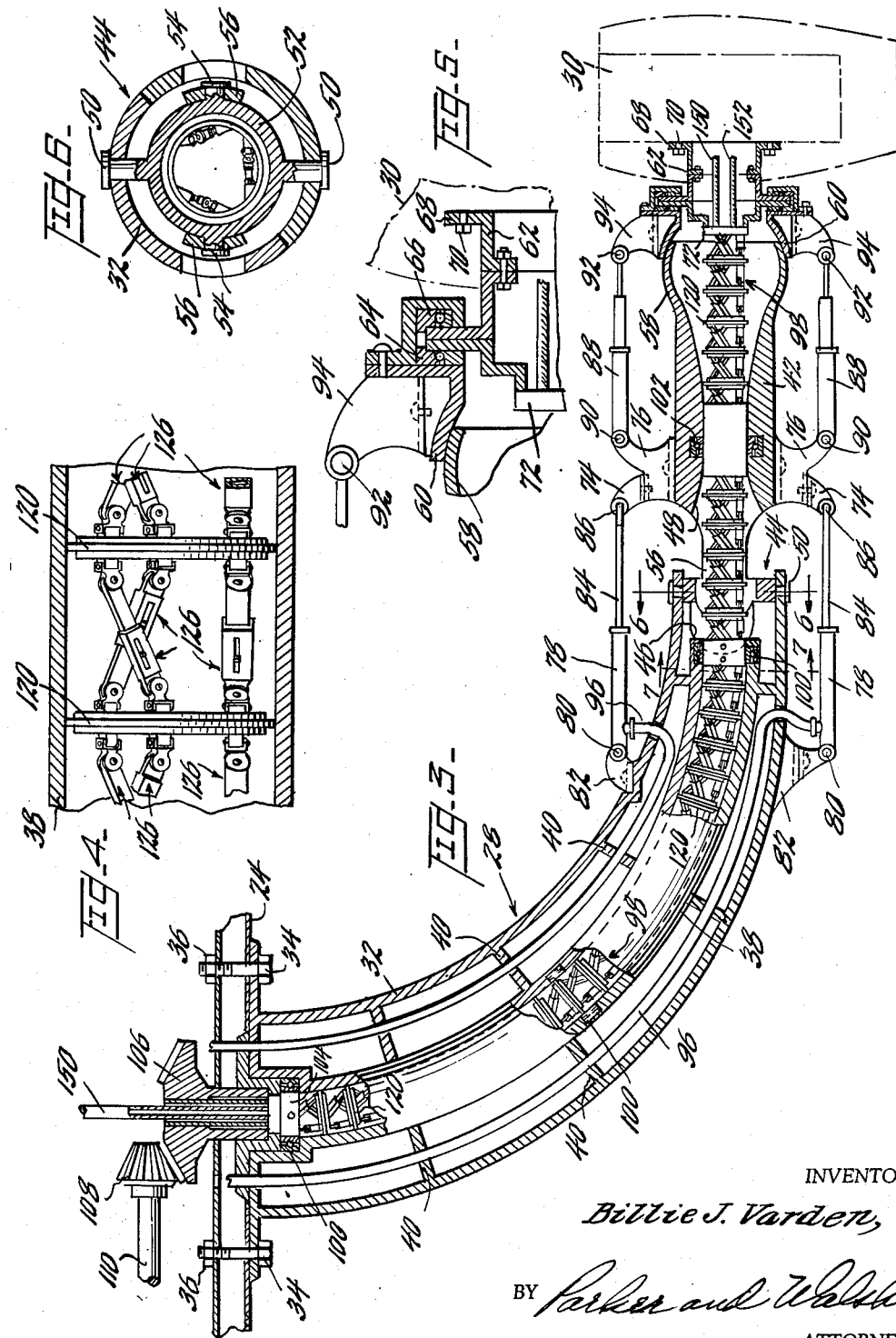

April 24, 1962 B. J. VARDEN 3,031,157
CONTROLLABLE MOUNT FOR AIRCRAFT POWER PLANT
Filed Nov. 5, 1958 3 Sheets-Sheet 3
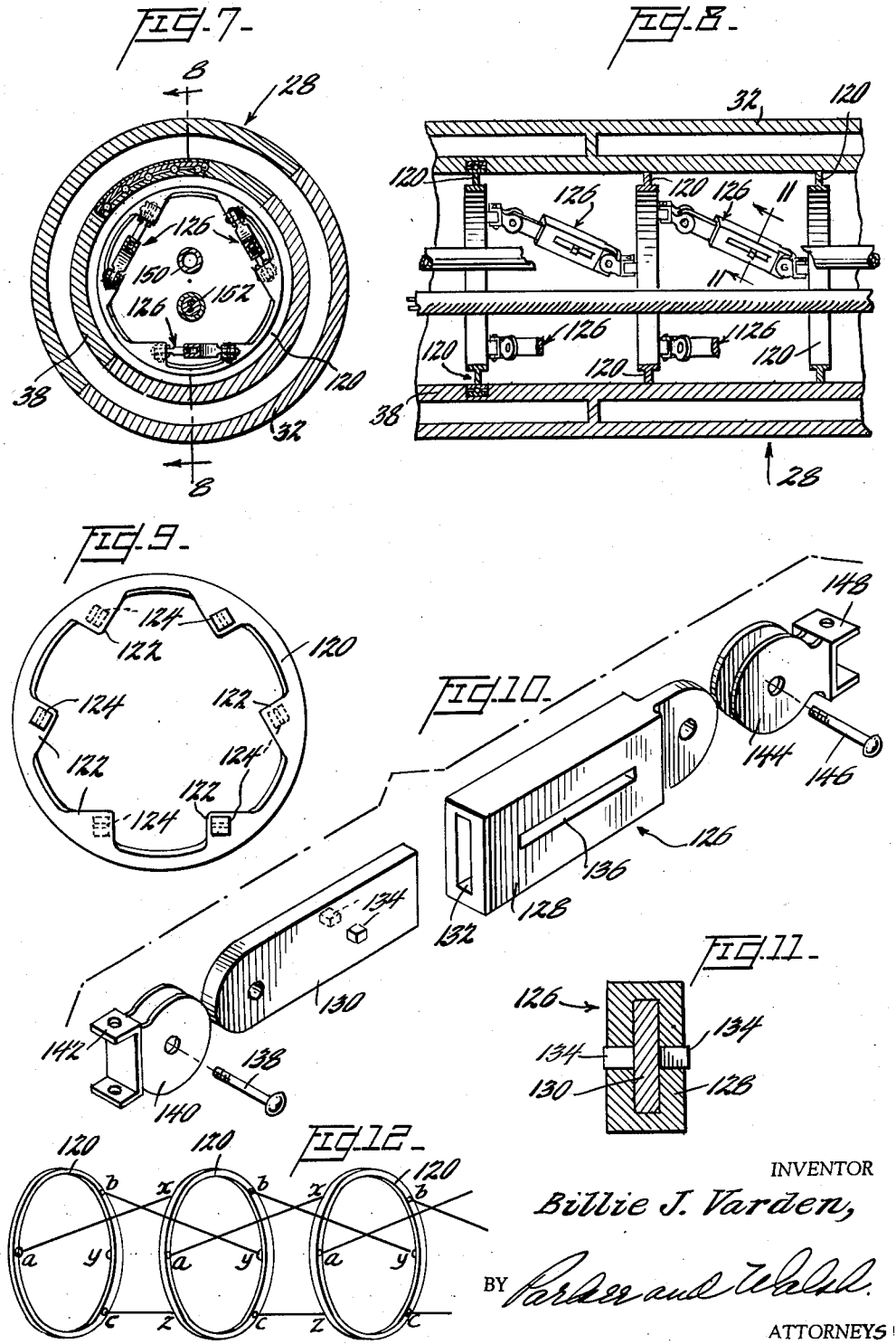
INVENTOR
Billie J. Varden,
BY
ATTORNEYS

United States Patent Office 3,031,157
Patented Apr. 24, 1962

3,031,157
CONTROLLABLE MOUNT FOR AIRCRAFT POWER PLANT
Billie J. Varden, P.O. Box 43,, Calera, Ala.
Filed Nov. 5, 1958, Ser. No. 772,082
11 Claims. (Cl. 244—52)

The present invention relates generally to the art of aeronautics and is more particularly directed to certain new and useful improvements in controllable mounts for aircraft power plants.

In the past, numerous proposals have been made and specific equipment designed for the purpose of supporting conventional aircraft power plants in such manner that the same may be employed both for steering and propulsion. However, as is well known to those skilled in the art, such prior proposals have received little, if any, attention from aircraft manufacturers due principally to the limited power available from conventional engine propeller combinations and the practical necessity of maintaining the line of thrust in a predetermined position in order to maintain controllability of the aircraft as a whole. It is only in recent times, therefore, that the advent of jet and nuclear power plants has rendered the concept of utilizing the aircraft power plant for both steering and propulsion feasible. In fact, it is common knowledge at the present time that sufficient power is now available in certain modern power plants to permit the aircraft to rise and land vertically and, in such aircraft, the power plants may be tilted to direct their thrust downwardly for take-off and landing and orientated in flight to provide propulsive thrust.

In the light of the foregoing, it is a principal object of the present invention to provide an aircraft having a controllable power plant mount by means of which the power plant may be oriented in substantially any direction to utilize its thrust for lift, propulsion and steering.

Another object of the invention is to provide a controllable mount for an aircraft power plant of the type described affording controlled orientation of such power plant in various positions.

A further object of the invention is to provide a controllable mount for an aircraft power plant of the type described employing a novel combination of mechanical and hydraulic or pneumatic control elements.

An additional object of the invention is to provide a controllable mount for the aircraft power plant of the type described embodying a novel articulate linkage affording flexibility of mechanical control function and, at the same time, providing ample interior space for the accommodation of the usual engine fuel and electric supply lines and the like.

Yet another object of the invention is to provide a novel articulate linkage especially adapted for use in a controllable power plant mount of the type described.

The foregoing together with other and further objects and advantages of the invention will become more readily apparent to those skilled in the art from a consideration of the following detailed specification taken in conjunction with the accompanying figures of drawing in which:

FIGURE 1 is a schematic top plan view illustrating a portion of the control elements utilized in conjunction with the improved power plant mount in accordance with the present invention;

FIGURE 2 is a schematic front elevational view of an aircraft as illustrated in FIGURE 1, showing one way in which the improved power plant mounts in accordance with the present invention may be attached to an aircraft structure;

FIGURE 3 is a longitudinal vertical cross-sectional view through the improved power plant mount in accordance with the present invention, taken substantially along the line 3—3 of FIGURE 1;

FIGURE 4 is an enlarged elevational view illustrating a portion of the novel articulate linkage shown in FIGURE 3, the surrounding housing being shown in cross-section;

FIGURE 5 is a fragmentary detail view, in cross-section, illustrating a portion of the power plant attaching elements as shown near the extreme right-hand end of the mount in FIGURE 3;

FIGURE 6 is a transverse cross-sectional view through a portion of the improved mount in accordance with the present invention, taken substantially along the line 6—6 of FIGURE 3;

FIGURE 7 is a transverse cross-sectional view taken substantially along the line 7—7 of FIGURE 2 and illustrating another portion of the improved mount in accordance with the present invention;

FIGURE 8 is a longitudinal vertical cross-sectional view similar to FIGURE 4 but taken substantially along the line 8—8 of FIGURE 7 and illustrating another portion of the improved mount in accordance with the present invention;

FIGURE 9 is a top plan view, to an enlarged scale, illustrating one of the rings forming a part of the improved articulate linkage in accordance with the present invention;

FIGURE 10 is an exploded perspective view illustrating one of the extensible arms forming a part of the novel articulate linkage in accordance with the present invention;

FIGURE 11 is a transverse cross-sectional view taken through one of the linkage arms substantially along the line 11—11 of FIGURE 8; and FIGURE 12 is an entirely schematic view, in perspective, illustrating the manner in which the arms and rings are interconnected to form the novel articulate linkage in accordance with the present invention.

Referring now in somewhat greater detail to the various figures of the drawings, and particularly to FIGURES 1 and 2 thereof, the novel power plant mount in accordance with the present invention is illustrated in conjunction with the schematic representation of an aircraft designated generally by reference numeral 20. It is to be clearly understood that the particular type of aircraft illustrated does not, per se, constitute a feature of the present invention and may be of any conventional or novel type useful as a personnel carrier, launching platform for missiles, or other purpose. In like manner, it is to be understood that many details of the aircraft are omitted from the showing, such as the landing gear, control surfaces, and the like, although the schematic showing includes a fuselage 22, wing 24, and empennage 26.

As illustrated particularly in FIGURE 2 of the drawings, the aircraft 20 is provided with a total of four power plant mounts which are substantially identical and each of which is designated generally by reference numeral 28. As shown in FIGURE 2, the mounts 28 are attached to, and extend from, the lower surface of the airfoil or wing 24 although it will be understood that the mounts 28 could also extend upwardly from the wing 24 or fuselage 22 and could be attached in any suitable manner to any properly designed portion of the aircraft structure. In like manner, while each of the mounts 28 is illustrated as being curved through an arc of substantially 90 degrees, it will also be understood that the principles of the present invention are equally applicable regardless of the degree of curvature or even entire lack of curvature of the mount. At the outer end of each of the mounts 28 there is attached, in a manner to be hereinafter more fully described, a suitable power plant 30 which, as previously mentioned, may be of any desired type but which is preferably of the jet or nuclear reaction principle.

Referring now particularly to FIGURE 3 of the drawings, the improved controllable power plant mount 28 is seen to comprise a generally curved, tubular exterior housing 32 which is attached at its inner end in any convenient manner as by means of bolts 34 and nuts 36 to a portion of the aircraft structure here shown as the wing 24. The exterior or primary housing 32 is hollow and is provided with an interior housing 38 spaced from the exterior housing as by means of spacer elements 40. An intermediate housing 42 is connected at its inner end to the outer end of the primary or exterior housing 32 by means of a universal joint designated generally as reference numeral 44. It will be noted that the outer end of the primary housing 32 is slotted as indicated by reference numeral 46 in FIGURE 3 to permit free pivoting movement of the inner end of the intermediate housing 42 which is likewise slotted as indicated by reference numeral 48, the latter slots being substantially at right angles to the slots 46.

As illustrated particularly in FIGURE 6, the universal joint 44 comprises a pair of diametrically opposed pivot pins 50 rotatably mounted in the primary housing 32 and carrying a gimbal ring 52. The gimbal ring 52 in turn carries a pair of pivot pins 54 which are diametrically opposed and the axis of which is at right angles to the axis of the pins 50. The bifurcated inner end 56 of the intermediate housing 42 is pivotally connected to the pins 54 so that the entire assembly permits universal pivoting motion in any direction.

At its outer end, the intermediate housing 42 is partially rounded or spherically shaped as indicated by reference numeral 58 and is adapted to support a terminal housing 60 which is similarly shaped and mounted on the intermediate housing so as to provide universal pivoting movement of the terminal housing about the outer end of the intermediate housing. A flanged bracket 62 is rotatably mounted in the terminal housing 60 in any convenient manner as by means of bearings 64 and 66 and the aircraft power plant 30 is secured to the exterior flange 68 of the bracket 62 in any suitable manner as by means of mounting bolts 70. The rotatable bracket 62 may take a variety of forms depending upon the particular type of power plant to be supported thereby and, at its inner end, includes a drive plate or ring 72 which is rigidly connected or forms a part of the bracket 62 and serves to rotate the latter in a manner to be hereinafter more fully set forth.

As perhaps best illustrated in FIGURE 3, and to a certain extent also in FIGURES 7 and 8, the central portion of the intermediate housing 42 is provided with a plurality of pairs of oppositely directed, integral ears 74 and 76 which, in the preferred form of the device as illustrated in the drawings, are each four in number evenly spaced about the periphery of the housing 42. A plurality of fluid pressure actuated servo motors 78, also preferably four in number, serve to interconnect the central portion of the intermediate housing and the exterior or primary housing 32, the cylinder ends of the servo motors 78 being pivottlly connected as at 80 to suitable brackets 82 provided on the exterior of the primary housing 32 and the piston rods 84 being pivotally connected as at 86 to the ears 74 on the intermediate housing 42. In like manner, the terminal housing 60 may be tilted about the end 58 of the intermediate housing 42 by means of a plurality of fluid pressure actuated servo motors 88 pivotally connected as at 90 to the ears 76 and pivotally connected as at 92 to a similar pair of ears or brackets 94 mounted upon the terminal housing 60.

It will be understood from the structure thus far described that controlled operation of the servo motors 78 and 88 will result in a tilting movement of the intermediate housing 42 with respect to the primary housing 32 and of the terminal housing 60 with respect to the intermediate housing 42. The servo motors 78 and 88 may be of any desired type and may be either pneumatic or hydraulic in operation. Since the servo motors are spaced about the periphery of the housings, it will be apparent that the tilting action or pivoting movement of the terminal housing 60 can be effected through an extremely wide range of positions. The combination of such tilting or pivoting movements, together with the rotation of the bracket 62 which is accomplished in a manner to be hereinafter more fully described, affords orientation of the power plant 30 in substantially any direction. The specific means for actuating the servo motors 78 is illustrated as a pair of fluid pressure conduits 96 which extend from the servo motors 78 through the space between the exterior and interior housings 32 and 38 to a suitable control point within the aircraft. Similar pressure conduits will be provided for the servo motors 88 although for the sake of simplicity these have been omitted from the drawings as has been the necessary control valves and pressure sources within the aircraft proper.

Still referring primarily to FIGURE 3 of the drawings, the specific means employed for effecting rotation of the bracket 62 and its attached power plant 30 comprises an articulate linkage which is designated generally by reference numeral 98. As illustrated, the linkage 98 is rotatably mounted within the interior housing 38, suitable bearings 100 being spaced along the interior housing 38 for that purpose. A similar bearing 102 is likewise preferably provided within the intermediate housing 42. At its outer end, the linkage 98 is connected to the drive ring 72 which in turn is connected to the bracket 62 and, at its inner end, the linkage 98 is similarly connected to a fitting 104 which is keyed or otherwise suitably secured to a ring gear 106. The ring gear 106 is adapted to be driven by a suitable pinion gear 108 connected to a control shaft 110 in such manner that rotation of the shaft 110 and its attached pinion gear 108 will cause rotation of the ring gear 106 and, in turn, will cause the fitting 104 to rotate the linkage 98 to effect rotation of the bracket 62 and power plant 30.

As shown in FIGURE 1, the shaft 110 may be rotated in any convenient manner as by means of a gear assembly 112 located convenient to the pilot of the aircraft. In order that the rotation applied to each of the power plants 30 may be uniform, suitable synchronizing equipment is provided as, for example, sprockets 114 and chains 116. In this way, operation of the control handle 118 of the gear assembly 112 will insure uniform and equal rotation of all of the power plants 30.

A preferred embodiment of the articulate linkage 98 is best illustrated in FIGURES 4 and 7 to 12, inclusive. As illustrated in these views, the linkage comprises a plurality of substantially parallel, spaced rings 120 rotatably mounted within the interior housing 38. As shown in FIGURE 9, each of the rings 120 is provided with a plurality of radially evenly spaced lugs 122, preferably three in number, on each of the opposite faces thereof. A suitable bearing is provided on each of the lugs 122 as indicated by reference numeral 124 and it will be particularly noted that the axes of the three bearings positioned on one face of each of the rings 120 are included approximately 120 degrees from each other. It will also be noted that the lugs 122 lying on one face of each of the rings 120 are radially evenly spaced between the lugs on the opposite face thereof. The adjacent rings 120 are interconnected by means of a plurality of arms 126, also preferably three in number, each of the arms 126 being pivotally connected at its opposite ends to the adjacent bearings 124 on a pair of adjacent rings.

Referring particularly to FIGURE 10, it will be noted that each of the arms 126 includes a pair of telescopically mounted elements 128 and 130, the element 130 being slidable within a suitable aperture 132 provided in the element 128. The extensibility of the arms 126 provided by the sliding movement of the element 130 within the aperture 132 is limited by means of a pin 134 which is engaged within a slot 136 after the elements 128 and 130 have been assembled. At its outer end, each of the elements 130 is pivotally connected as by means of a pin 138 to a clevis 140 provided with a second clevis 142 at right angles thereto. Similarly, each of the elements 128 is pivotally connected at its outer end to a clevis 144 by means of a pin 146 and each clevis 144 is provided with a secondary clevis 148 at right angles thereto. It will be understood that the clevises 142 and 148 are connected to adjacent bearings 124 provided on pairs of adjacent rings 120.

Although the manner of interconnecting the adjacent rings 120 by means of arms 126 to provide a complete articulate linkage 98 is somewhat difficult to visualize, it is believed that a more complete understanding of the same may be had by reference to the schematic or diagrammatic showing of FIGURE 12. In that view, there are illustrated three of the adjacent rings 120 together with a number of straight lines representing the connecting arms 126. For the purpose of defining the connecting points of each of the arms 126 and its associated rings 120, the lugs or bearings on the upper face of each ring as it appears to the observer is represented by the letters "a," "b" and "c." The corresponding attachment points on the reverse face of each ring 120 not apparent to the observer are designated by reference characters "x," "y" and "z." It will thus be apparent that each of the rings 120 is connected to its neighbor on the right by means of one arm 126 extending from point "a" to point "x," a second arm 126 extending from point "b" to point "y," and a third arm 126 extending from point "c" to point "z." While the perspective view affords a somewhat distorted appearance to the assembly, it may be observed that the same arrangement of arms and rings extends throughout the length of the linkage 98.

As mentioned previously, one of the advantages of an arrangement in accordance with the present invention is that the necessary supply lines for the transmission of fuel, electricity, and the like, to the power plant 30 may be provided internally. Such an arrangement is illustrated in FIGURE 7 of the drawings wherein a fuel supply line 150 and electric supply line 152 are shown extending through the central portion of the articulate linkage 98.

While it is believed that the operation of the device in accordance with the present invention will be largely apparent from the foregoing description, it may be noted that selective operation of the fluid pressure control instrumentalities (not shown) by the pilot of the aircraft will be effective to actuate the selected servo motors 78 or 88 in such manner as to cause a tilting of the intermediate housing 42 and terminal housing 60 with respect to the primary or exterior housing 32. Actuation of the handle 118 by the pilot will then, through the gear train 112 and shaft 110, cause the pinion gear 108 to rotate the ring gear 106 which in turn will impart rotation to the engine mounting bracket 62 by means of the articulate linkage 98. Since each of the arms 126 of the linkage 98 is capable of limited extensibility, whereas the rings 120 are restrained within the interior housing 38, tilting of the terminal housing 60 by means of the servo motors will not adversely affect the ability of the linkage 98 to transmit rotational movement to the bracket 62. It will be apparent that the combination of control movement of the servo motors and the linkage will be effective to provide selective orientation of the power plants in substantially any position.

While I have shown and described herein a preferred embodiment of the invention solely for the purpose of illustration, it is to be understood that numerous modifications, alterations and deviations from the specific structure disclosed will occur to those skilled in the art without departing from the spirit or scope of the invention as set forth in the appended claims.

I claim:
1. A controllable mount for an aircraft power plant comprising a curved tubular exterior housing adapted to be attached at its inner end to the aircraft structure, an interior housing mounted within and spaced from said exterior housing, an intermediate housing, a universal joint connecting the inner end of said intermediate housing to the outer end of said exterior housing, a terminal housing, means mounting said terminal housing for universal pivoting movement at the other end of said intermediate housing, a flanged bracket rotatably mounted in said terminal housing and adapted to support said power plant, a plurality of fluid pressure actuated servo motors interconnecting the central portion of said intermediate housing and said exterior housing, a plurality of fluid pressure actuated servo motors interconnecting the central portion of said intermediate housing and said terminal housing, control means for all servo motors including a plurality of fluid pressure conduits extending from said servo motors through the space between said exterior and interior housings into the aircraft, an articulate linkage rotatably mounted within said interior housing and said intermediate housing and said terminal housing and connected at its outer end to said bracket for rotating the latter, control means for said linkage including a ring and pinion gear assembly secured to the inner end of said linkage for rotating the latter, and fuel and electric supply lines extending from the aircraft to the power plant through the interior of said linkage, the combination of control movements of said servo motors and said linkage providing selective orientation of said power plant in substantially any position.

2. A controllable mount for an aircraft power plant comprising a curved tubular exterior housing adapted to be attached at its inner end to the aircraft structure, an interior housing mounted within and spaced from said exterior housing, an intermediate housing, a universal joint connecting the inner end of said intermediate housing to the outer end of said exterior housing, a terminal housing, means mounting said terminal housing for universal pivoting movement at the other end of said intermediate housing, a flanged bracket rotatably mounted in said terminal housing and adapted to support said power plant, a plurality of fluid pressure actuated servo motors interconnecting the central portion of said intermediate housing and said exterior housing, a plurality of fluid pressure actuated servo motors interconnecting the central portion of said intermediate housing and said terminal housing, control means for all servo motors including a plurality of fluid pressure conduits extending from said servo motors through the space between said exterior and interior housings into the aircraft, an articulate linkage rotatably mounted within said interior housing and said intermediate housing and said terminal housing and connected at its outer end to said bracket for rotating the latter and control means for said linkage including a ring and pinion gear assembly secured to the inner end of said linkage for rotating the latter, the combination of control movements of said servo motors and said linkage providing selective orientation of said power plant in substantially any position.

3. A controllable mount for an aircraft power plant comprising a tubular exterior housing adapted to be attached at its inner end to the aircraft structure, an interior housing mounted within and spaced from said exterior housing, an intermediate housing, a universal joint connecting the inner end of said intermediate housing to the outer end of said exterior housing, a terminal housing, means mounting said terminal housing for universal pivoting movement at the other end of said intermediate housing, a bracket rotatably mounted in said terminal housing and adapted to support said power plant, a plurality of fluid pressure actuated servo motors interconnecting the central portion of said intermediate housing and said exterior housing, a plurality of fluid pressure actuated servo motors interconnecting the central portion of said intermediate housing and said terminal housing, control means for all servo motors, an articulate linkage rotatably mounted within said interior housing and said intermediate housing and said terminal housing and connected at its outer end to said bracket for rotating the latter and control means for said linkage including a ring and pinion gear assembly secured to the inner end of said linkage for rotating the latter, the combination of control movements of said servo motors and said linkage providing selective orientation of said power plant in substantially any position.

4. A controllable mount for an aircraft power plant comprising a tubular exterior housing adapted to be attached at its inner end to the aircraft structure, an interior housing mounted within and spaced from said exterior housing, an intermediate housing, a universal joint connecting the inner end of said intermediate housing to the outer end of said exterior housing, a terminal housing, means mounting said terminal housing for universal pivoting movement at the other end of said intermediate housing, a bracket rotatably mounted in said terminal housing and adapted to support said power plant, a plurality of fluid pressure actuated servo motors interconnecting the central portion of said intermediate housing and said exterior housing, a plurality of fluid pressure actuated servo motors interconnecting the central portion of said intermediate housing and said terminal housing, control means for all servo motors, an articulate linkage rotatably mounted within said interior housing and said intermediate housing and said terminal housing and connected at its outer end to said bracket for rotating the latter and control means for rotating said linkage, the combination of control movements of said servo motors and said linkage providing selective orientation of said power plant in substantially any position.

5. A controllable mount for an aircraft power plant comprising a primary housing adapted to be attached at its inner end to the aircraft structure, an intermediate housing, a universal joint connecting the inner end of said intermediate housing to the outer end of said primary housing, a terminal housing, means mounting said terminal housing for universal pivoting movement at the outer end of said intermediate housing, a bracket rotatably mounted in said terminal housing and adapted to support said power plant, a plurality of fluid pressure actuated servo motors interconnecting said intermediate housing and said primary housing, a plurality of fluid pressure actuated servo motors interconnecting said intermediate housing and said terminal housing, control means for all said servo motors, an articulate linkage rotatably mounted within all said housings and connected at its outer end to said bracket for rotating the latter, and means for rotating said linkage, the combination of control movements of said servo motors and said linkage providing selective orientation of said power plant in substantially any position.

6. A controllable mount for a power plant comprising a primary housing, an intermediate housing tiltably connected to said primary housing, a terminal housing, means mounting said terminal housing for pivoting movement at the outer end of said intermediate housing, power plant supporting means rotatably mounted in said terminal housing, a plurality of servo motors interconnecting said intermediate housing and said primary housing, a plurality of servo motors interconnecting said intermediate housing and said terminal housing, control means for all said servo motors, an articulate linkage rotatably mounted within all said housings and connected at its outer end to said supporting means for rotating the latter, and means for rotating said linkage, the combination of control movements of said servo motors and said linkage providing selective orientation of said power plant in substantially any position.

7. A controllable mount for a power plant comprising a primary housing, a terminal housing, means mounting said terminal housing for pivoting movement relative to said primary housing, power plant supporting means rotatably mounted in said terminal housing, a plurality of servo motors for imparting pivoting movement to said terminal housing, control means for said servo motors, an articulate linkage rotatably mounted within said housings and connected at its outer end to said supporting means for rotating the latter, and means for rotating said linkage, the combination of control movements of said servo motors and said linkage providing selective orientation of said power plant in substantially any position.

8. A controllable mount for a power plant as set forth in claim 7 wherein said linkage comprises a plurality of substantially parallel, spaced rings, each of said rings having three radially evenly spaced lugs on each face thereof, bearing means on each lug having their axes inclined approximately 120 degrees from each other, the lugs on one face of each ring being radially evenly spaced between the lugs on the opposite face thereof, and three arms interconnecting each ring with its adjacent rings, each of said arms being pivotally connected at its opposite ends to adjacent bearing means on a pair of adjacent rings and including a pair of telescopically mounted elements provided with a pin and slot connection therebetween affording limited extensibility.

9. A controllable mount for a power plant as set forth in claim 7 wherein said linkage comprises a plurality of spaced rings, each of said rings having a plurality of spaced lugs on each face thereof, the lugs on one face of each ring being radially evenly spaced between the lugs on the opposite face thereof, and a plurality of arms interconnecting each ring with its adjacent rings, each of said arms being pivotally connected at its opposite ends to adjacent lugs on a pair of adjacent rings and including a pair of telescopically mounted elements provided with a pin and slot connection therebetween affording limited extensibility.

10. A controllable mount for a power plant as set forth in claim 7 wherein said linkage comprises a plurality of spaced rings, each of said rings having a plurality of spaced lugs on each face thereof, the lugs on one face of each ring being radially evenly spaced between the lugs on the opposite face thereof, and a plurality of arms interconnecting each ring with its adjacent rings, each of said arms being pivotally connected to its opposite end to adjacent lugs on a pair of adjacent rings.

11. A controllable mount for a power plant as set forth in claim 7 wherein said linkage comprises a plurality of spaced rings and a plurality of arms interconnecting each ring with its adjacent rings.

References Cited in the file of this patent

UNITED STATES PATENTS

| | | |
|---|---|---|
| 369,865 | Mann | Sept. 13, 1887 |
| 1,747,693 | Bertone | Feb. 18, 1930 |
| 1,766,390 | Lapin | June 24, 1930 |
| 1,851,867 | Rieder | Mar. 29, 1932 |
| 1,966,309 | Otwell | July 10, 1934 |
| 2,677,931 | Prieto | May 11, 1954 |

FOREIGN PATENTS

| | | |
|---|---|---|
| 351,914 | Great Britain | Dec. 23, 1929 |
| 1,092,559 | France | Nov. 10, 1954 |